US011072076B2

(12) United States Patent
Altur Sánchez et al.

(10) Patent No.: US 11,072,076 B2
(45) Date of Patent: Jul. 27, 2021

(54) MACHINE FOR MANUFACTURING PALLETS

(71) Applicant: Mandriladora Alpesa, S.L., Valencia (ES)

(72) Inventors: Sergio Altur Sánchez, Valencia (ES); Antonio Javier Altur Sánchez, Valencia (ES)

(73) Assignee: Mandriladora Alpesa, S.L., Valencia (ES)

( * ) Notice: Subject to any disclaimer, the term of this patent is extended or adjusted under 35 U.S.C. 154(b) by 0 days.

(21) Appl. No.: 16/630,360

(22) PCT Filed: Mar. 27, 2018

(86) PCT No.: PCT/ES2018/070256
§ 371 (c)(1),
(2) Date: Jan. 10, 2020

(87) PCT Pub. No.: WO2019/012167
PCT Pub. Date: Jan. 17, 2019

(65) Prior Publication Data
US 2020/0180158 A1 Jun. 11, 2020

(30) Foreign Application Priority Data

Jul. 11, 2017 (ES) ................................ ES201730827
Jul. 18, 2017 (ES) ................................ ES201730851

(51) Int. Cl.
*B25J 11/00* (2006.01)
*B29C 31/00* (2006.01)
(Continued)

(52) U.S. Cl.
CPC .......... *B25J 11/005* (2013.01); *B29C 31/002* (2013.01); *B29C 65/52* (2013.01);
(Continued)

(58) Field of Classification Search
CPC ... B25J 9/00; B25J 11/005; B25J 11/00; B25J 15/0047; B27M 3/0086; B29C 31/002;
(Continued)

(56) References Cited

U.S. PATENT DOCUMENTS 5,382,214 A * 1/1995 Mano .................. B31D 5/00
108/54.1
2017/0336194 A1 11/2017 Foulk et al.

FOREIGN PATENT DOCUMENTS

DE 2444124 A1 4/1976
DE 4016033 A1 11/1991
(Continued)

*Primary Examiner* — Michael A Tolin
(74) *Attorney, Agent, or Firm* — The Webb Law Firm

(57) ABSTRACT

The machine comprises a rotary feeder configured to receive the first tubular body and the second tubular body; wherein the first tubular body and the second tubular body are secured to one another separately in a single coaxial direction in the rotary feeder; and wherein the two tubular bodies make up separators of the pallets. The machine also comprises a robotic arm configured to transfer the two tubular bodies in pairs from the rotary feeder to an area above a transport table on which a first base of the pallet rests; so that one of the end portions of the second tubular body fits into an opening of the first base; wherein the robotic arm places the first tubular body around the second tubular body.

16 Claims, 10 Drawing Sheets

(51) Int. Cl.
    *B29C 65/52*      (2006.01)
    *B29C 65/78*      (2006.01)
    *B31D 5/00*      (2017.01)
    *B65D 19/38*      (2006.01)
    *B29C 65/00*      (2006.01)
    *B27M 3/00*      (2006.01)

(52) U.S. Cl.
CPC ...... *B29C 65/7841* (2013.01); *B29C 66/1122* (2013.01); *B29C 66/5221* (2013.01); *B29C 66/53261* (2013.01); *B29C 66/53465* (2013.01); *B29C 66/863* (2013.01); B27M 3/0086 (2013.01); B31D 5/00 (2013.01); B65D 19/38 (2013.01); B65D 2519/00378 (2013.01); B65D 2519/00562 (2013.01)

(58) Field of Classification Search
CPC ... B29C 65/52; B29C 65/524; B29C 65/7802; B29C 65/7841; B29C 66/1122; B29C 66/5221; B29C 66/53261; B29C 66/53465; B29C 66/863; B31D 5/00; B65D 19/0012; B65D 19/0026; B65D 19/38; B65D 2519/00019; B65D 2519/00054; B65D 2519/00089; B65D 2519/00273; B65D 2519/00278; B65D 2519/00288; B65D 2519/0318; B65D 2519/00323; B65D 2519/00333; B65D 2519/00343; B65D 2519/00378; B65D 2519/00562; B65D 2519/00318

See application file for complete search history.

(56) References Cited

FOREIGN PATENT DOCUMENTS

| | | |
|---|---|---|
| EP | 0076231 A2 | 4/1983 |
| ES | 1138831 U | 4/2015 |
| ES | 1169584 U | 11/2016 |
| FR | 2754786 A1 | 4/1998 |
| FR | 2825944 A1 | 12/2002 |
| GB | 1454173 A | 10/1976 |
| GB | 2271336 A | 4/1994 |
| WO | 2016170207 A | 10/2016 |

\* cited by examiner

MACHINE FOR MANUFACTURING PALLETS

CROSS REFERENCE TO RELATED APPLICATIONS

This application is the United States national phase of International Application No. PCT/ES2018/070256 filed Mar. 27, 2018, and claims priority to Spanish Utility Model Patent Application Nos. U201730827 filed Jul. 11, 2017 and U201730851 filed Jul. 18, 2017, the disclosures of which are hereby incorporated by reference in their entirety.

BACKGROUND OF THE INVENTION

Field of the Invention

The present invention relates to a machine for manufacturing pallets, with each one of said pallets comprising a first base and a second base which are joined to one another by means of separators which comprise pairs of independent tubular bodies which are handled by means of a gripper which is designed to automate one of the manufacturing phases of the pallets such as the one described in the Spanish utility model application No. U 201631202.

Thus, the separators include first tubular bodies and second tubular bodies which are located inside the first tubular bodies comprising a concentric configuration of double tubular bodies which constitute supports of the pallets. The machine of the invention is particularly configured for manufactured of the pallets described in the Spanish utility models applications No. U 201530445 and U 201631202 wherein the material used is cardboard, without excluding other materials. The machine of the invention enables the manufacture of the pallets to be speeded up substantially and, as a result of this, reducing the final cost of the pallets. The machine of the invention allows the manufacture of the pallets to be automated, and more specifically the action of gluing and assembling the separators forming the supports of the pallets.

Description of Related Art

At present, pallets are known among which stand out pallets which comprise two bases and separators joining said bases.

The pallets can be assembled manually and also by means of automatic methods by way of pallet manufacturing machines such that the performance of these machines is low and consequently the productivity is also low; such that all of this results in the pallets obtained being relatively expensive.

In some cases, such as the pallet described in the Spanish utility model application No. U 201631202, it includes separators formed by pairs of concentric tubular bodies; one interior and another exterior which has a shorter length than the interior tube such that there is a certain difficulty when assembling said separators.

SUMMARY OF THE INVENTION

With the aim of achieving the objectives and avoiding the drawbacks mentioned in the previous sections, the invention proposes a machine for manufacturing pallets, with each one of the pallets comprising a first base, a second base and separators.

Each one of the separators in turn includes a first tubular body and a second tubular body located inside the first tubular body; wherein the second tubular body includes end portions that protrude with respect to the ends of the first tubular body; wherein said end portions are configured to fit inside opposing openings located in the first base and second base; and wherein the ends of the first tubular body are seated on opposing faces of the first base and second base.

The second base is the last element that is assembled in the pallet, being able to be assembled in the machine of the invention and it may even be that it is assembled in a different machine.

The machine for manufacturing pallets comprises:
- a rotary feeder configured to receive the first tubular body and the second tubular body; wherein the first tubular body and the second tubular body are secured to one another separately and in a single coaxial direction in the rotary feeder.
- a robotic arm configured to transfer the first tubular body and the second tubular body in pairs from the rotary feeder to an area above a transport table on which the first base of the pallet rests; wherein the robotic arm is also configured to fit one of the end portions of the second tubular body into the opening of the first base when it rests on the transport table; and wherein the robotic arm is configured to place the first tubular body around the second tubular body with one end of the first tubular body resting on the first base.
- a gripper configured to secure the first tubular body and the second tubular body;
- wherein said gripper being incorporated into the robotic arm.

The machine of the invention also comprises:
- an upper transporter and a lower transporter which are located at different heights and are configured to separately support the first tubular body and the second tubular body.
- a first actuator and a second actuator which are configured to transfer the first tubular body and the second tubular body separately when they are supported on the upper transporter and lower transporter.

The first actuator and the second actuator are configured to transfer the first tubular body and the second tubular body from the two transporters, upper and lower, to the rotary feeder.

The robotic arm includes a gripper configured to secure the first tubular body along the interior face thereof and the second tubular body along the interior face thereof; wherein the first tubular body and the second tubular body are secured and spaced apart from one another in a single coaxial direction on the gripper.

The machine also comprises at least one injector device configured to apply at least one first adhesive bead on an exterior face of one of the end portions of the second tubular body when the first tubular body and the second tubular body are secured and spaced apart from one another in the same coaxial direction on the gripper which makes up part of the robotic arm such that the gripper is configured to rotate when applying the first adhesive bead on the exterior face of the second tubular body of the separator; wherein said first adhesive bead is configured to reinforce the joining of each separator to the first base of the pallet; and wherein the end portion impregnated with the adhesive of the second tubular body fits into the opening of said first base of the pallet.

The rotary feeder comprises an upper support and a lower support at different heights which have several radial housings configured to receive the first tubular bodies and second tubular bodies.

The rotary feeder in turn comprises retention devices located corresponding to outlets of the radial housings of the rotary feeder; wherein each retention device comprises a pair of fins which articulate in axes against the resistance of springs; and wherein said fins are configured to press against the tubular bodies by the action of the springs to ensure the securing of the first and second tubular bodies when they are located in the radial housings of the rotary feeder.

The first base is stably secured via the transport table by way of a pressure device which pushes on said first base against the transport table.

The gripper comprises a first securing module configured to secure the first tubular body along the internal face thereof and a second securing module configured to secure the second tubular body along the internal face thereof.

The two securing modules comprise first mandrels and second mandrels respectively which are equidistant from a central axial direction of a structure of the gripper.

The gripper further comprises first linear actuators and second linear actuators which are configured to move the first mandrels and the second mandrels in radial directions.

The gripper is configured to simultaneously secure the first tubular body and the second tubular body in coaxial positions spaced apart from one another.

The first and second mandrels comprise curved plates and guide plates by way of which said mandrels are coupled to the structure of the gripper.

In one embodiment of the invention, the linear actuators comprise plungers which are coupled in radial openings located in first bodies and second bodies which are integral to the structure of the gripper.

The second securing module is located in an end part of the gripper, while the first securing module is located in an intermediate part of said gripper.

The first mandrels and the second mandrels include chamfered leading edges configured to facilitate the start of a relative axial coupling between said mandrels and the tubular bodies.

The first mandrels comprise exterior steps which separate first parts with dimensions in accordance with a closed contour delimited by the internal face of the first tubular body and second parts with dimensions in accordance with a closed contour delimited by the internal face of the second tubular body; wherein the second parts of the first mandrels are intended to complement the securing of the second tubular body.

In one embodiment of the invention, the curved plates of the mandrels have exterior faces which include rough surfaces which are configured to improve the grip and securing of the tubular bodies.

In another embodiment of the invention, the curved plates of the mandrels have exterior faces which include recesses which are configured to insert into them strips of elastomer material to improve the grip and securing of the tubular bodies.

Below, in order to facilitate better comprehension of this specification and forming an integral part of the same, a series of figures are included in which in an illustrative and non-limiting manner the object of the invention has been represented.

DESCRIPTION OF THE INVENTION

Figure 1:
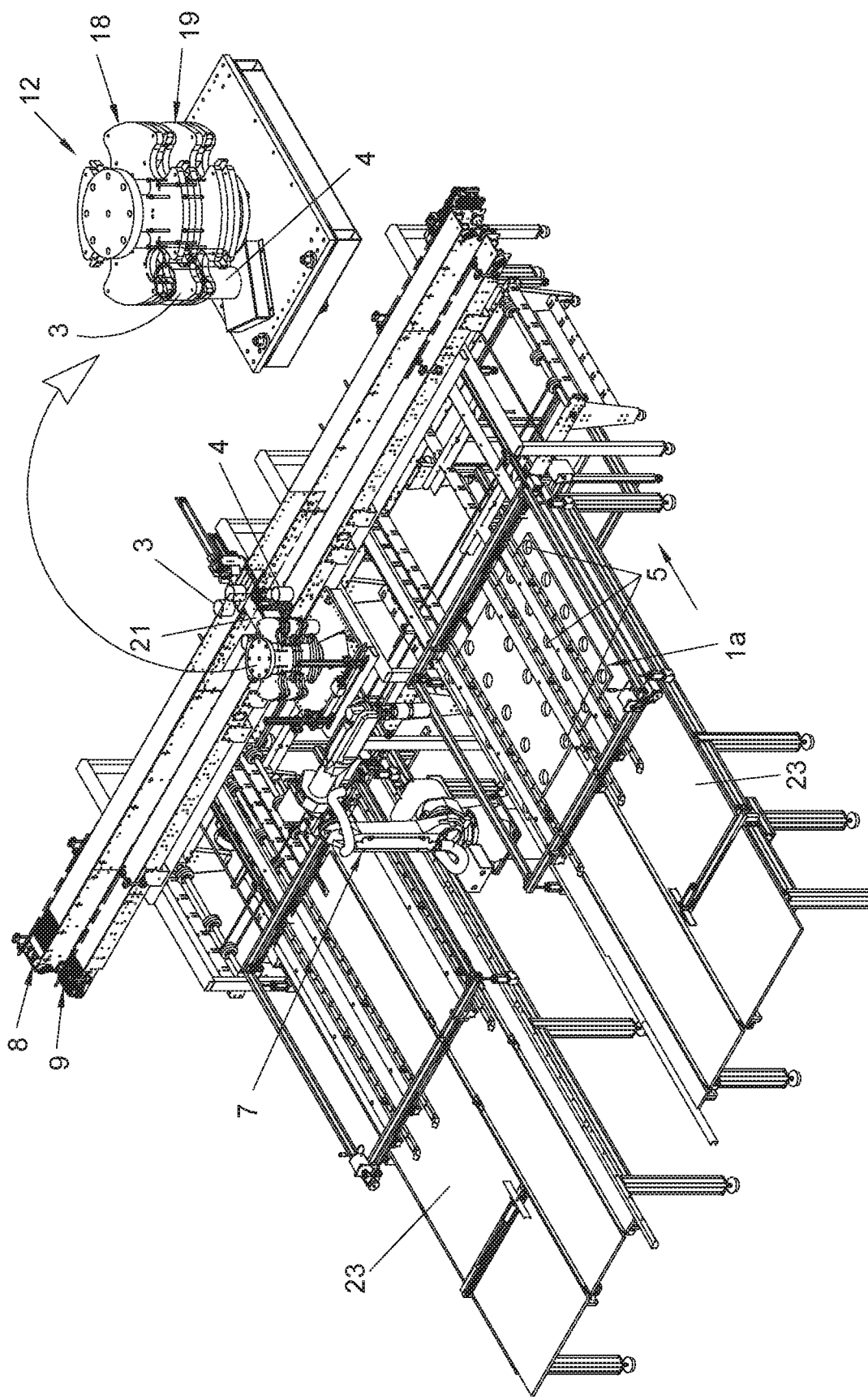
FIG. 1 shows a perspective view of the machine for manufacturing pallets, object of the invention. Each pallet comprises two opposing bases and separators formed by pairs of tubular bodies.
Figure 2:
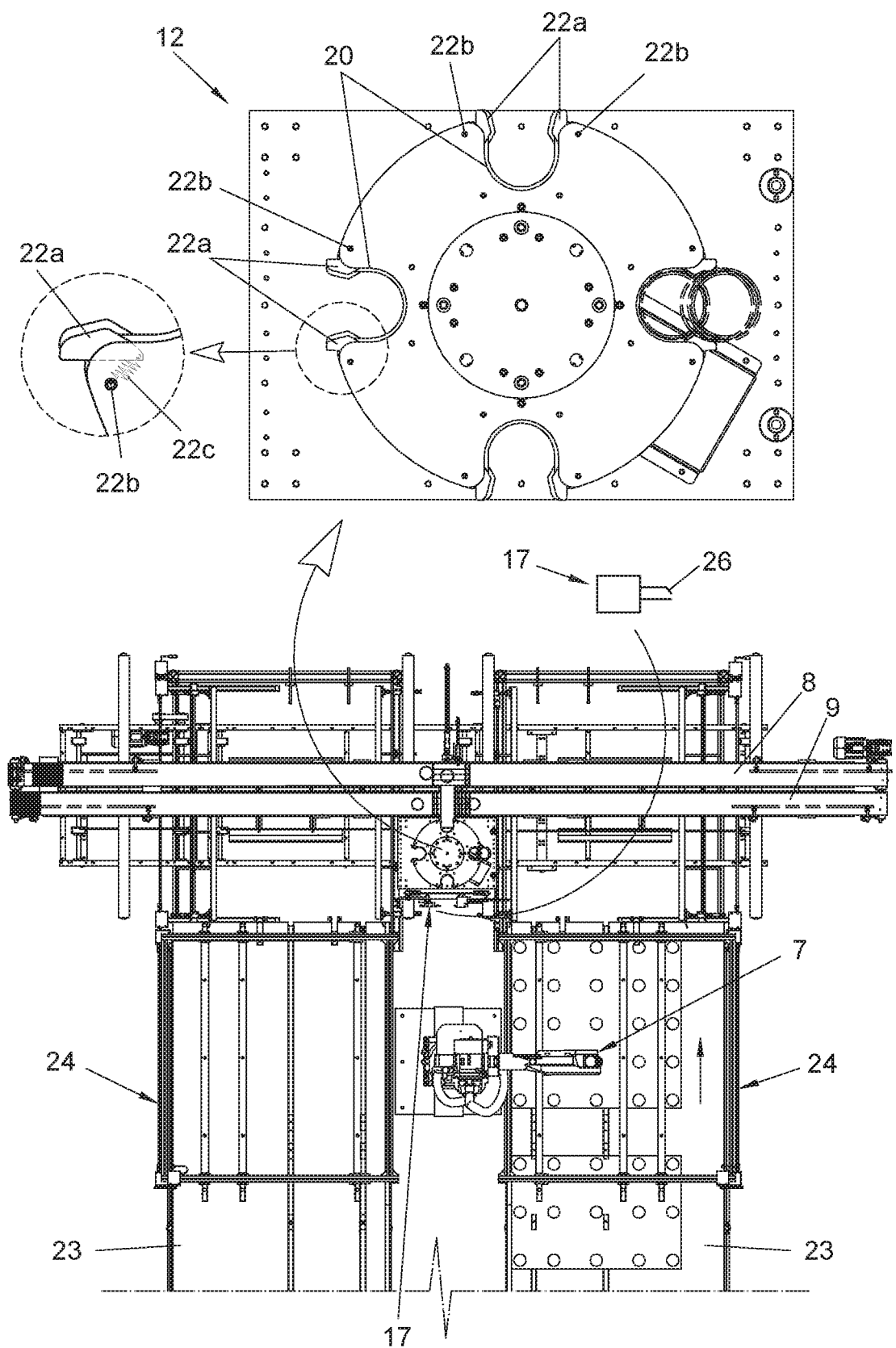
FIG. 2 shows a top view of the machine of the invention.
Figure 3:
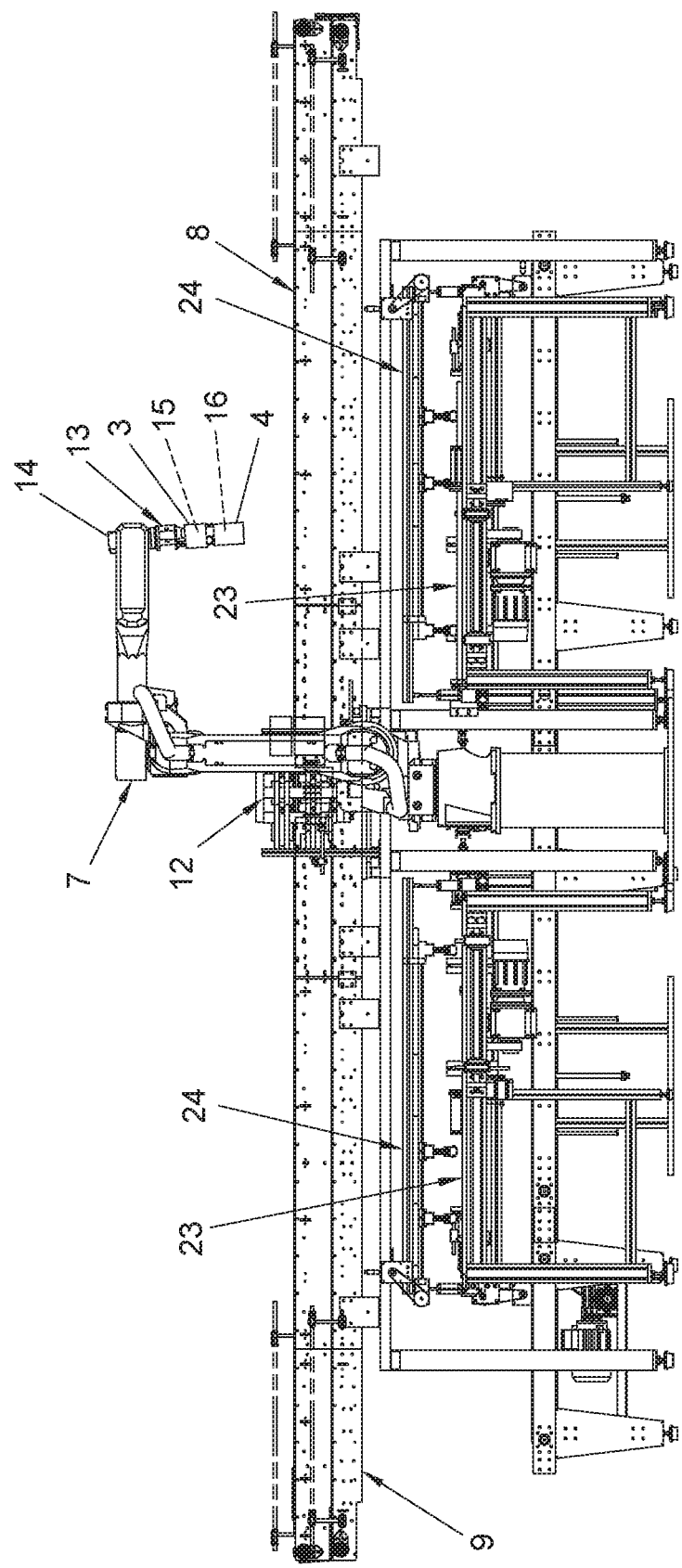
FIG. 3 shows a front view of the machine.
Figure 4:
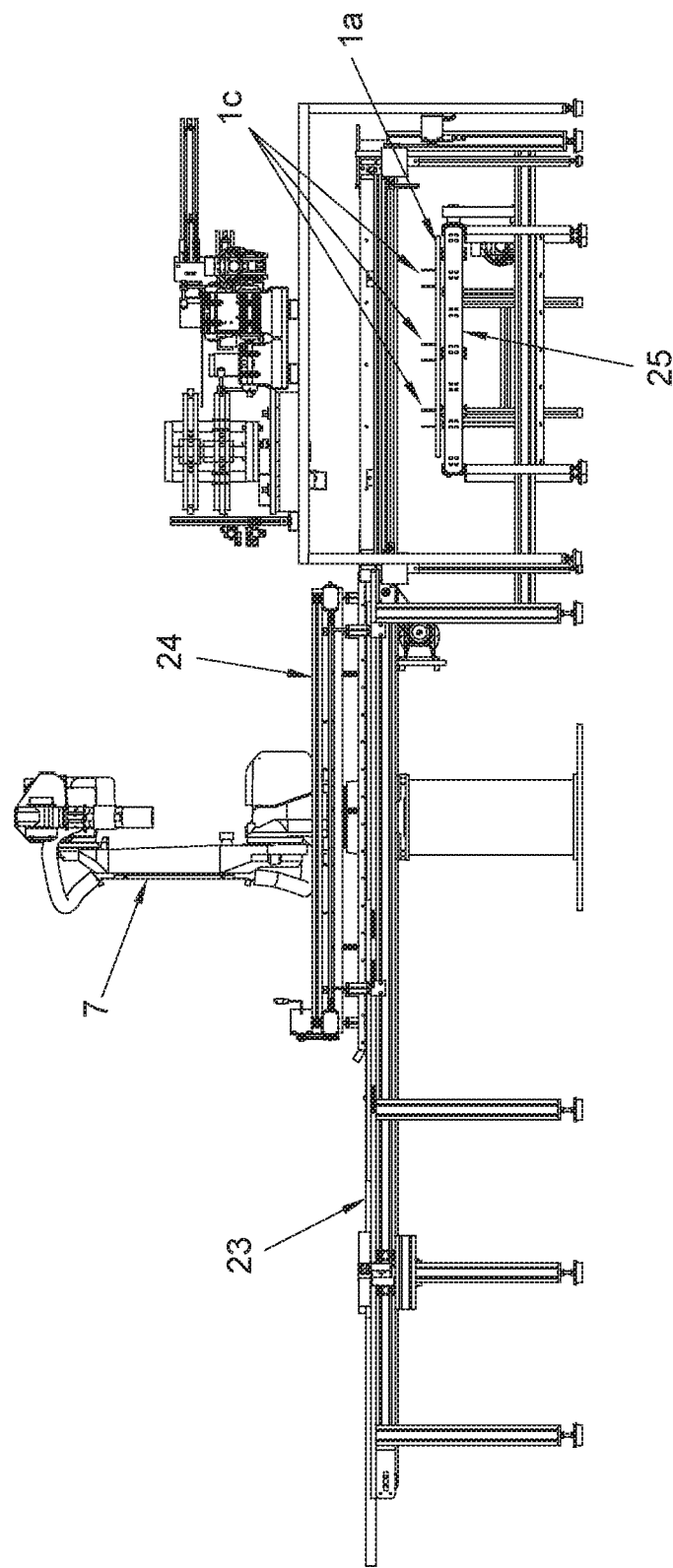
FIG. 4 shows a side view of the machine.
Figure 5:
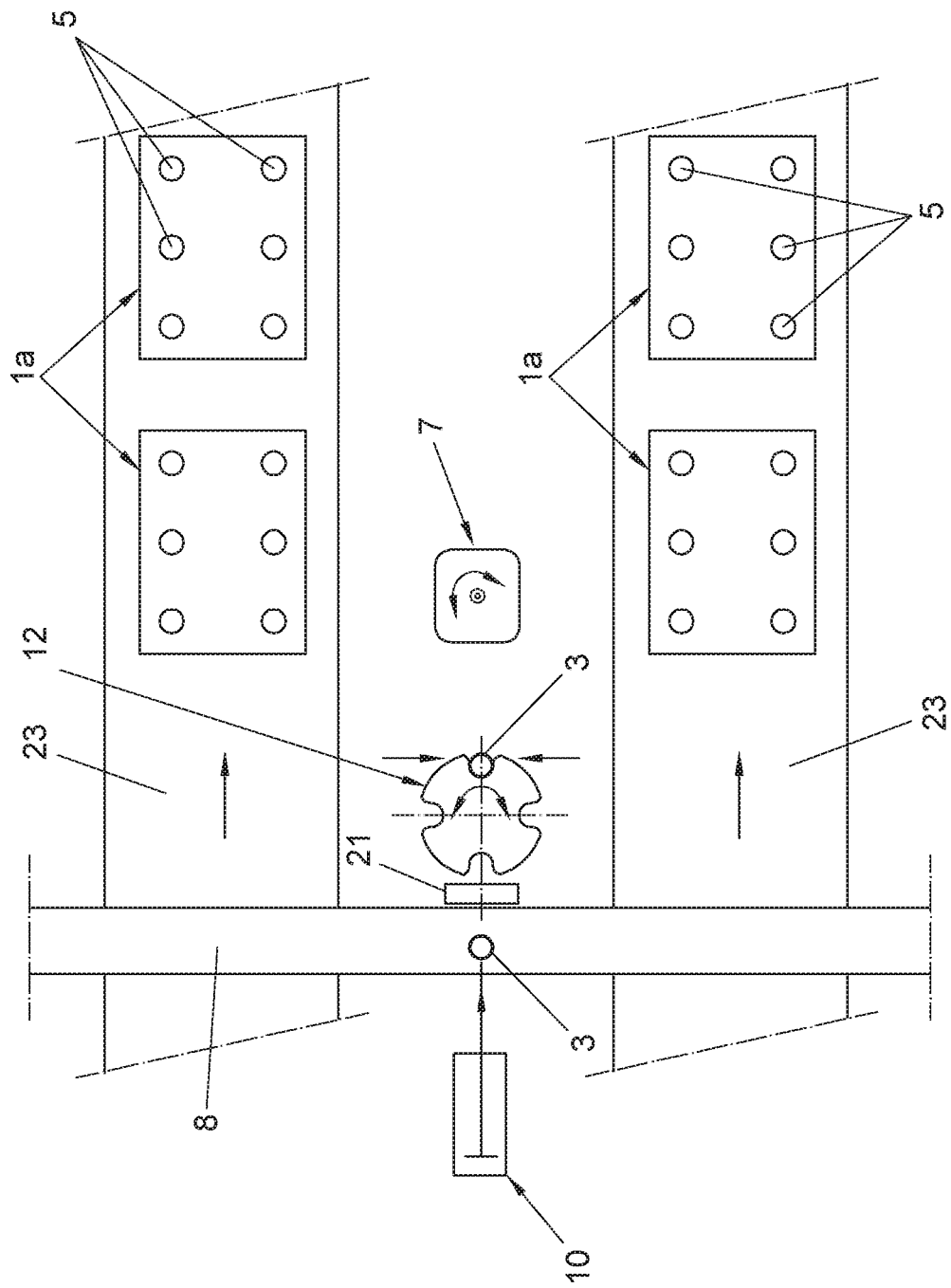
FIG. 5 shows a schematic plan view highlighting the process of transferring the pairs of tubular bodies from transporters to place them on a first base forming part of the pallet.
Figure 6:
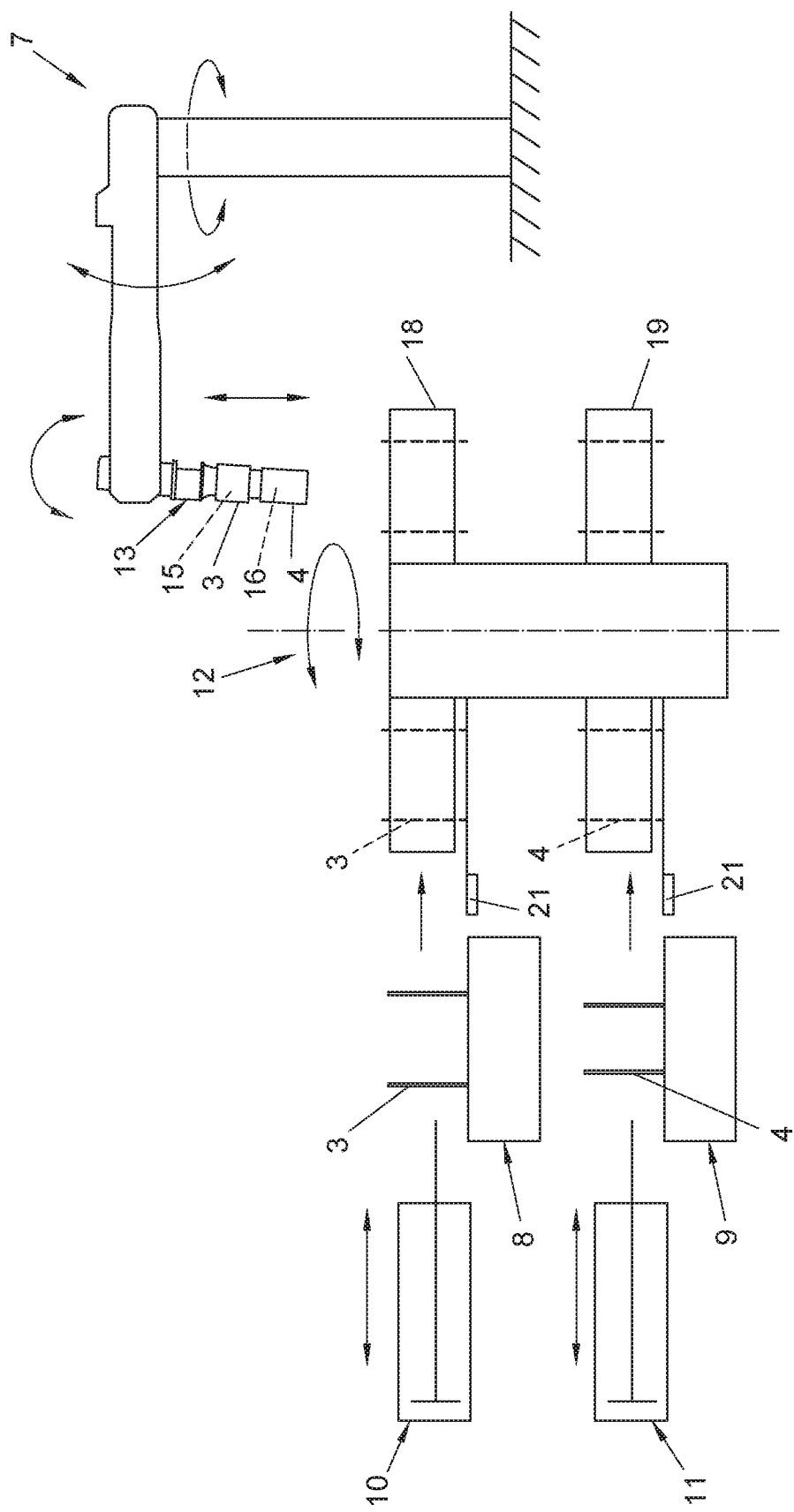
FIG. 6 shows a front view of what is represented in FIG. 5.
Figure 7:
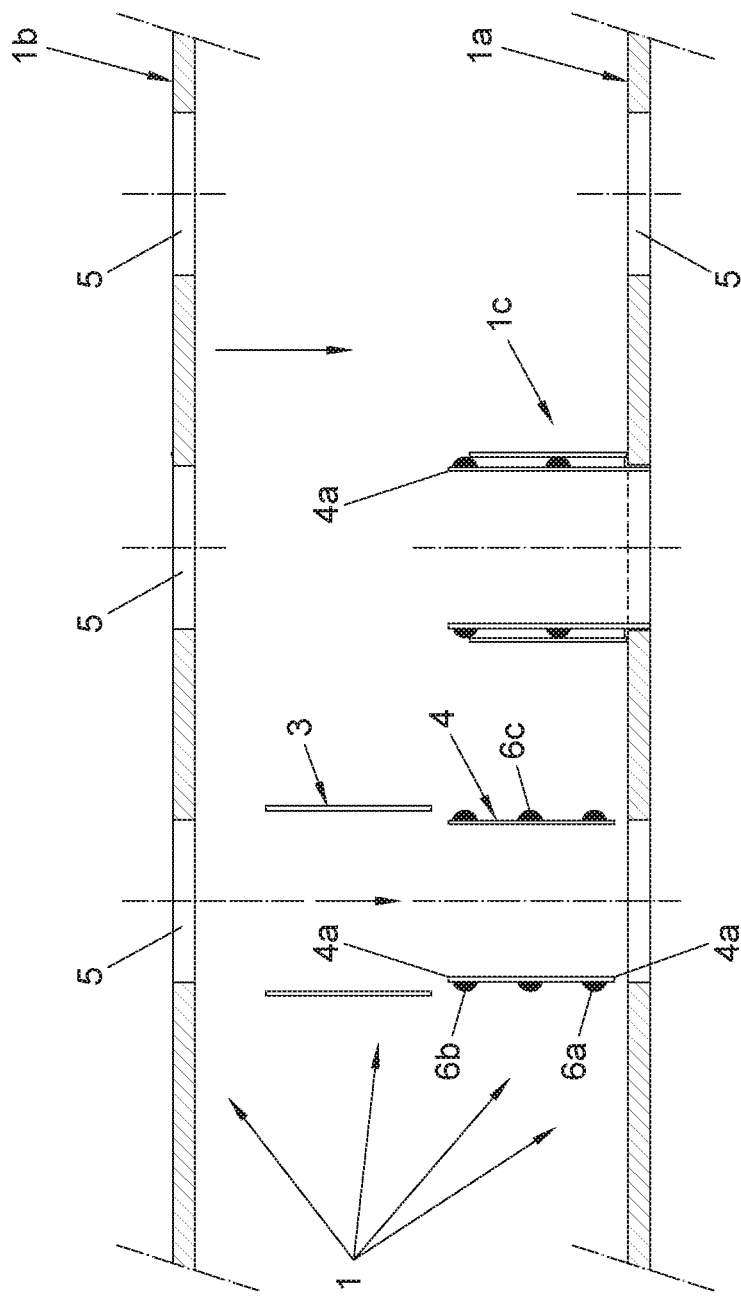
FIG. 7 shows a schematic view wherein the process of coupling each separators on a first base of the pallet is shown.
Figure 8:
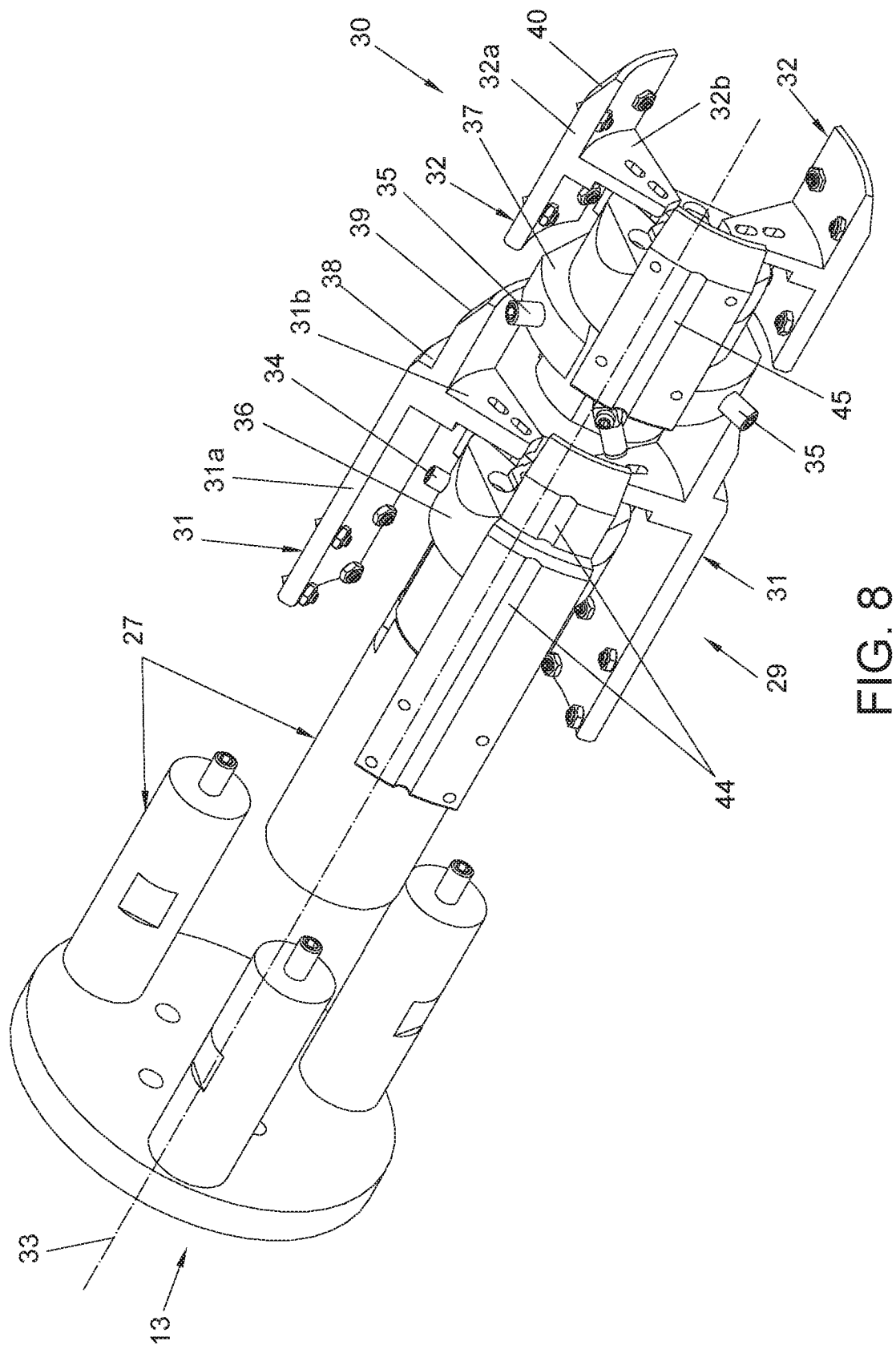
FIG. 8 shows an exploded perspective view of a gripper for handling the tubular bodies forming part of the pallet.
Figure 9:
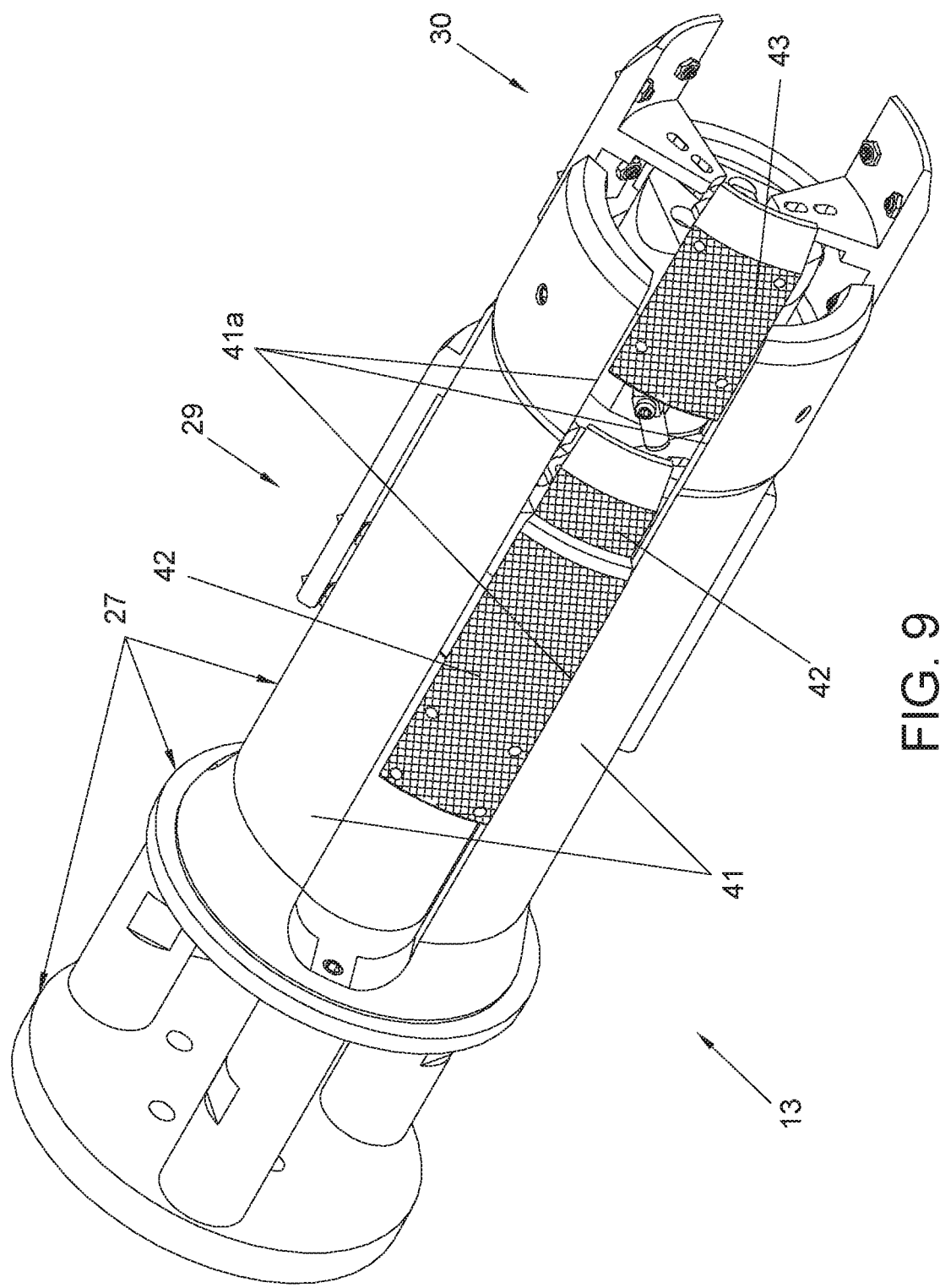
FIG. 9 shows a perspective view of the gripper.
Figure 10:
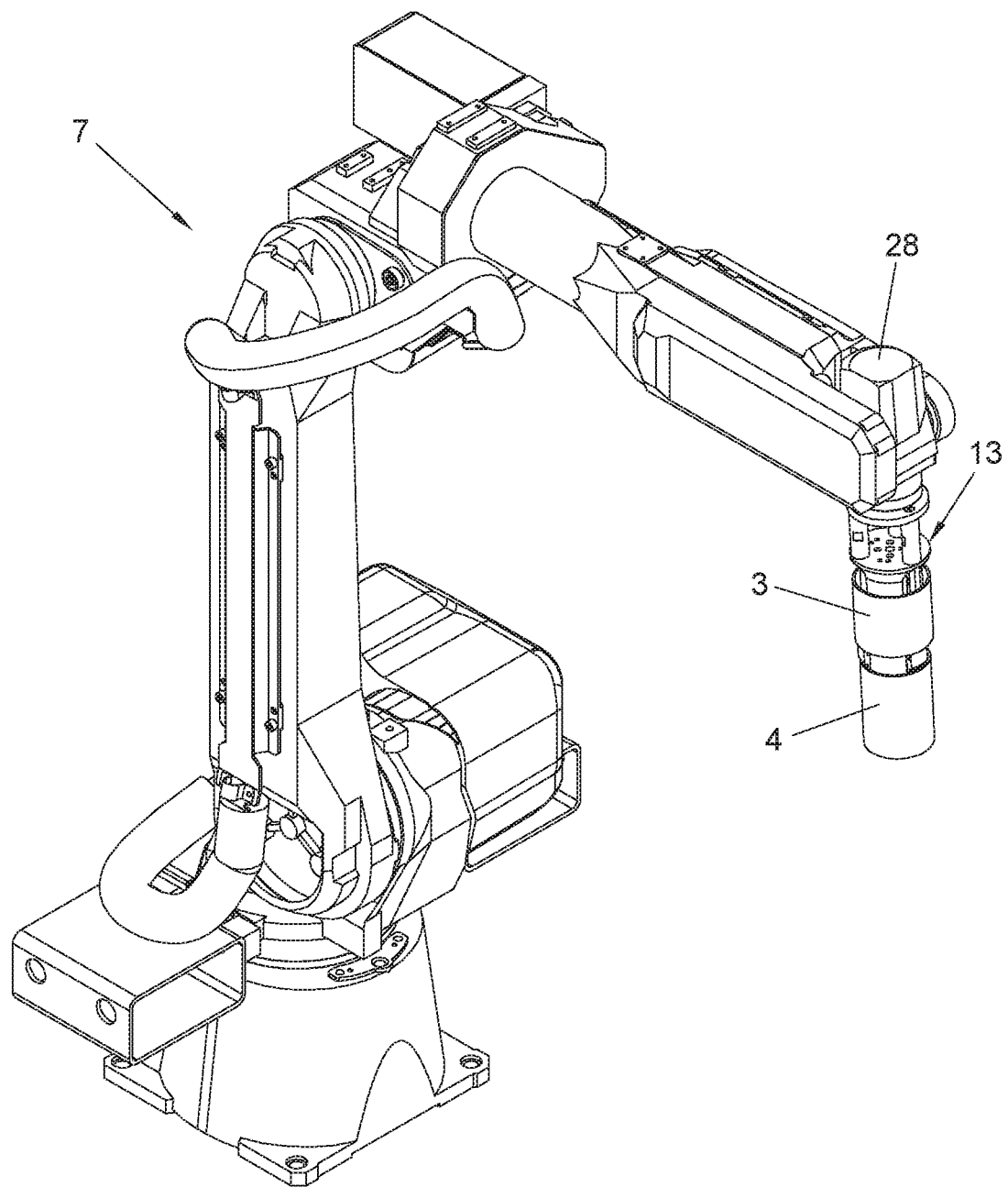
FIG. 10 shows a perspective view of a robotic arm wherein the gripper is incorporated.

With reference to FIGS. 1-10, the machine for manufacturing pallets 1 comprises two tables 23 configured to receive first bases 1a of the pallets 1, each one of which comprises the first base 1a, a second base 1b and separators 1c that join the two bases 1a, 1b; wherein each one of the separators comprises a first tubular body 3 and a second tubular body 4 located inside the first tubular body 3.

The second tubular bodies 4 comprise end portions 4a which protrude with respect to the ends of the first tubular bodies 3 such that said end portions 4a of the second tubular bodies 4 are fitted inside opposing openings 5 located in the first base 1a and in the second base 1b of each pallet 1; wherein at least the separators 1c are joined to the first base 1a with a reinforcement of a first adhesive bead 6a.

In another embodiment of the invention, each pair of tubular bodies, first 3 and second 4, are joined together by means of a centred adhesive bead 6c formed by one or more strands, while the ends of the first tubular bodies 3 sit on opposing internal faces of the first base 1a and second base 1b of each pallet 1.

In another embodiment of the invention, the separators 1c are joined to the second base 1b with an added reinforcement of a second adhesive bead 6b.

It should be noted that only the application of the first adhesive bead 6a is required, while the second adhesive bead 6b and the centred adhesive bead 6c are optional, although the application thereof is also recommended.

Normally, the adhesive material is cold or hot glue; the hot glue being applied in the joint between the separators 1c and the first base 1a of the pallet 1, while cold glue is applied in the other described joints; wherein with the application of hot glue a more rapid joint is achieved and with the cold glue a stronger joint is achieved.

The second base 1b is the last element which is assembled on the pallet 1, it being possible to be assembled in the machine of the invention itself and said second base 1b may even be assembled in a different machine; wherein in both cases said second base is assembled by means of an additional robotic arm not represented in the figures.

The machine of the invention further comprises a robotic arm 7 configured to transfer the pairs of tubular bodies 3, 4 in pairs; an upper transporter 8 and a lower transporter 9 which support the tubular bodies 3, 4 separately and which are strategically located at different heights; a first actuator 10 and a second actuator 11 configured to displace the tubular bodies 3, 4 separately; a rotary feeder 12 configured to receive the tubular bodies 3, 4 from the two upper 8 and lower 9 transporters.

The robotic arm 7 comprises a gripper 13 which includes a support structure, in a part of which a motor 14 is connected which is configured to make the assembly of said gripper 13 rotate.

The gripper 13 is configured to handle the tubular bodies 4, 5 and comprises a first securing module 15 configured to secure the first tubular body 3 along the interior face thereof and a second securing module 16 configured to secure the second tubular body 4 along the interior face thereof; wherein both tubular bodies 3, 4 secured in the gripper 13 are in one same coaxial direction, but spaced apart from one another.

The adhesive beads 6a, 6b, 6c are applied on an exterior face of each second tubular body 4 in a phase wherein said second tubular body is secured by the gripper 13. To this end, the application of the adhesive beads 6a, 6b, 6c is carried out by means of at least one injector device 17 which has at least one nozzle 26 through which the adhesive material flows in a phase wherein in one embodiment of the invention, the gripper 13 carries out rotations of 180° and in another embodiment, the gripper 13 carries out rotations of 360°; all of which when the motor 14 is activated which makes said gripper 13 rotate.

With regard to what was said in the previous paragraph, when the machine of the invention comprises a single injector device 17, this includes at least one nozzle 23 to apply at least one of the adhesive beads 6a, 6b, 6c; while when the machine includes several injector devices 17, each one of these includes a nozzle 26 to apply at least one of said adhesive beads.

The rotary feeder 12 comprises an upper support 18 and a lower support 19 at different heights which have several radial housings 20 which are configured to receive the first tubular bodies 3 and second tubular bodies 4 from the upper transporters 8 and lower transporters 9. To this end, said tubular bodies 3, 4 are pulled to the rotary feeder 12 by means of the first actuator 10 and the second actuator 11; wherein while they are pulled the tubular bodies 3, 4 they rest on intermediate plates 21.

When the tubular bodies 3, 4 are fitted inside the radial housings 20 of the rotary feeder 12, they are secured by means of retention devices located corresponding to outlets of said radial housings 20; wherein each retention device comprises a pair of fins 22a which articulate in axes 22b against the resistance of springs 22c such that said fins 22a press against the tubular bodies 3, 4 ensuring the securing thereof.

Once the rotary feeder 12 receives each pair of tubular bodies 3, 4, said rotary feeder 12 rotates an angular space to place the pair of tubular bodies 3, 4 in another position wherein the gripper 13 extracts the pair of tubular bodies 3, 4, securing them stably along the interior faces thereof by means of prior activation of the securing modules, first 15 and second 16.

Said tubular bodies 3, 4 secured by the gripper 13 are spaced apart from one another in one same coaxial direction by means of the two securing modules 15, 16; wherein once they are extracted from the rotary feeder 12, the gripper 13 carries out rotations of 180° or rotations of 360° to apply the adhesive beads 6a, 6b, 6c on the second tubular body 4, as referred to previously.

Once the adhesive beads 6a, 6b, 6c are applied on the second tubular body 4, the robotic arm 7 transfers the pair of tubular bodies 3, 4 to one of the two transport tables 23 whereon the first bases 1a of the pallets 1 are supported; wherein the gripper 13 descends downwards to fit one of the lower end portions 4a of the second tubular body 4 inside the opening 5 of the respective first base 1a; ensuring the joint by means of the first adhesive bead 6a.

The first bases 1a are secured on the transport tables 23 by way of pressure devices 24 which push on said first bases 1a against the transport tables 23.

Then, the two securing modules 15, 16 of the gripper 13 are deactivated; wherein in this phase the first tubular body 3 of the separator 1c falls by gravity downwards to rest on the first plate 1a of the pallet 1; and wherein in this phase the centred adhesive bead 6c (if it is previously applied) comes into contact with an internal face of the first tubular body 3, consequently the first tubular body 3 and the second tubular body 4 are joined integrally by means of the centred adhesive bead 6c.

Once all the separators 1c have been fastened to the first base 1a resting on the respective transport table 23, the second base 1b is then placed; this is an operation wherein the upper end portions 4a of the second tubular bodies 4 of the separators 1c are fitted into the openings 5 of the second base 1b of the respective pallet 1; wherein the joint of the separators 1c and second base 1b are reinforced with the second adhesive bead 6b, if it has been previously applied.

The second base 1b of each pallet 1 is assembled in a final phase, either by means of the machine of the invention or in another machine. Furthermore, it should be noted that the second base 1b can comprise a single plate like the first base 1a or several runners formed by elongated strips.

In order to achieve the greatest solidity of each pallet 1, the centred adhesive bead 6c and also the other two adhesive beads, first 6a and second 6b, are applied; thus the contract areas of the separators 1c and the two bases, first 1a and second 1b, of the pallet 1 are impregnated, corresponding to the end portions 4a of the second tubular bodies 4 and support areas of the ends of the first tubular bodies 3 on the two bases 1a, 1b of the pallet 1.

Thus, the two transport tables 23 receive the first bases 1a which are positioned and stabilised so that the robotic arm 7 by way of the gripper 13 thereof then deposits each pair of first tubular bodies 3 and second tubular bodies 4 in pairs, positioning them in the respective openings 5 of the first bases 1a resting on the tables 23, at least the first adhesive bead 6a having been previously applied on the second tubular body 4.

In a certain area of the transporters, upper 8 and lower 9, the extraction area of the tubular bodies 3, 4, which make up each separator 1c, is established for which purpose the actuators 10, 11 move them towards the rotary feeder 12 which receives each pair of tubular bodies 3, 4 and then positions them normally at 180° with respect to the loading position so that the robotic arm 7 extracts them by way of the gripper 13 thereof and passes them beforehand through the injector device 17 for adhesive material and then places them corresponding to each one of the openings 5 of the first base 1a as described above.

Once each first base 1a has all the separators 1c, the pressure devices 12 are released and the assembly formed by the first base 1a and separators 1c advances said assembly towards a lower area located below the upper 8 and lower 9 transporters; from where said assembly is extracted by means of a transport device 25.

The machine of the invention is complemented by several computer vision chambers, not shown, which essentially assist the robotic arm 7 with identifying the exact position of the different openings 5 of the first base 1a of each pallet.

Said chambers are generally located in a zenithal area of the machine; being conventional in any assembly machine or installation wherein robotic arms are involved.

It should be noted that the machine has been designed so that it can grow modularly and although it could function with a single transport table 23, it is normal to use the high capacity of the robotic arm 7 and use at least two transport tables 23 which considerably increases productivity.

This is the reason why the transporters 8, 9 are extended beyond the extraction area of the actuators 10, 11, apart from enabling the advance thereof to be reversible such that they can be loaded from the other side, if required by the location of the machine.

The gripper 13 comprises a support structure 27, one part of which is connected to a motor 28 configured to make the assembly of the gripper 13 rotate, with said motor 28 being supported by the robotic arm 7.

The gripper 13 comprises a first securing module 29 configured to secure the first tubular body 3 in a cylindrical manner and a second securing module 30 configured to secure the second tubular body 4 in a cylindrical manner which has a smaller diameter than the first tubular body 3; wherein the two securing modules 29, 30 comprise first mandrels 31 and second mandrels 32, respectively, which are equidistant from a central axial direction 33 of the gripper 13.

The first mandrels 31 and the second mandrels 32 comprise curved plates 31a, 32a and guide plates 31b, 32b by way of which said mandrels 31, 32 are coupled to the support structure 27 of the gripper 13.

The gripper 13 also comprises first linear actuators 34 and second linear actuators 35 to be able to move the mandrels 31, 32 in radial directions, maintaining the equidistance of said mandrels 31, 32 with respect to the central axial direction 33 of the gripper 13.

The first linear actuators 34 and the second linear actuators 35 comprise plungers which are coupled in radial openings located in first bodies 36 and second bodies 37 which are integral to the support structure 27 of the gripper 13.

The second securing module 30 is located on an end part of the gripper 13, while the first securing module 29 is located on an intermediate part of said gripper 13.

The curved plates 31a of the first mandrels 30 are configured to secure the first tubular body 3, while the curved plates 32a of the second mandrels 32 are configured to secure the second tubular body 4; wherein during the securing of the tubular bodies 3, 4 the mandrels 31, 32 are located inside said tubular bodies 3, 4; and wherein exterior faces of the curved plates 31a, 32a are in contact with internal faces of the tubular bodies 3, 4; such that during the securing of the gripper 13, the mandrels 31, 32 push, by means of the action of the first linear actuators 34 and second linear actuator 35, against the internal faces of the tubular bodies 3, 4, maintaining them in coaxial positions spaced apart from one another.

The first mandrels 31 comprise exterior steps 38 which separate parts with a larger diameter in accordance with the diameter of the internal face of the first tubular body 3 and parts with a smaller diameter in accordance with the diameter of the internal face of the second tubular body 4; wherein these parts with a smaller diameter are intended to complement the securing of the second tubular body 4 which has a smaller diameter than the first tubular body 3.

The first mandrels 31 and the second mandrels 32 include chamfered leading edges 39, 40 to facilitate the relative axial coupling between said mandrels 31, 32 and the tubular bodies 3, 4 in a phase wherein said axial coupling is initiated.

The first mandrels 31 and the second mandrels 32 are aligned in several equidistant longitudinal directions at an angle to one another; wherein in each one of said longitudinal directions, a first mandrel 31 and a second mandrel 32 are located; and wherein the mandrels 31, 32 are fitted into longitudinal channels delimited between pairs of parallel edges 41a of fixed guides 41.

The curved plates 31a, 32a of the first mandrels 31 and second mandrels 32 make up a ring-shaped configuration in a cylindrical manner with diametric dimensions which vary by means of activating the first linear actuators 34 and second linear actuators 35 to be able to adapt to the diameters of the internal faces of the first tubular bodies 3 and second tubular bodies 4. It should also be indicated that the first mandrels 31 and the second mandrels 32 are able to be disassembled in order to exchange them for others with the aim of being able to adapt them to different morphologies of said tubular bodies 3, 4.

In one embodiment of the invention, the exterior faces of the curved plates 31a, 32a of the first mandrels 31 and second mandrels 32 comprise rough surfaces 42, 43 to improve the grip of the tubular bodies 3, 4 when said rough surfaces 42, 43 are in contact with the internal faces of the first tubular bodies 7 and second tubular bodies 8.

In another embodiment of the invention, the curved plates 31a, 32a of the first mandrels 31 and second mandrels 32 incorporate recesses 44, 45 to be able to insert therein strips of elastomer material to improve the grip of the first tubular bodies 3 and second tubular bodies 4 when said strips are in contact with the internal faces of said tubular bodies 3, 4; wherein said strips are exchangeable in order to adapt more efficiently to tubular bodies 3, 4 of different dimensions. In the particular embodiment shown in FIGS. 1-10, the recesses 44, 45 are straight and are arranged in longitudinal directions, without discarding other configurations and orientations of said recesses 44, 45.

The invention claimed is:

1. A machine for manufacturing pallets, wherein each pallet comprises a first base, a second base and separators, each one of which includes a first tubular body and a second tubular body located inside the first tubular body; wherein the second tubular body includes end portions which protrude with respect to ends of the first tubular body; wherein said end portions are configured to fit inside opposing openings located in the first base and second base; and wherein the ends of the first tubular body are seated on opposing faces of the first base and second base; comprising:

a rotary feeder configured to receive the first tubular body and the second tubular body; wherein the first tubular body and the second tubular body are secured separately and coaxially in the rotary feeder;

a robotic arm configured to transfer the first tubular body and the second tubular body in pairs from the rotary feeder to an area above a transport table on which the first base of the pallet rests; wherein the robotic arm is also configured to fit one of the end portions of the second tubular body into an opening of the first base when it is resting on the transport table; and wherein the robotic arm is configured to locate the first tubular body around the second tubular body with an end of the first tubular body resting on the first base; and a gripper configured to secure the first tubular body and the second tubular body; wherein said gripper is incorporated in the robotic arm.

2. The machine for manufacturing pallets according to claim 1, further comprising:

an upper transporter and a lower transporter which are located at different heights and are configured to separately support the first tubular body and the second tubular body, respectively;

a first actuator and a second actuator which are configured to respectively transfer the first tubular body and the second tubular body separately when they are supported on the upper transporter and the lower transporter;

wherein the first actuator and the second actuator are configured to respectively transfer the first tubular body and the second tubular body from the two transporters, upper and lower, to the rotary feeder.

3. The machine for manufacturing pallets according to claim 1, wherein the robotic arm includes the gripper configured to secure the first tubular body along an interior face thereof and the second tubular body along an interior face thereof; wherein the first tubular body and the second tubular body are secured and spaced apart from one another and coaxially on the gripper.

4. The machine for manufacturing pallets according to claim 3, further comprising at least one injector device configured to apply at least one first adhesive bead on an exterior face of one of the end portions of the second tubular body when the first tubular body and the second tubular body are secured and spaced apart from one another coaxially on the gripper which makes up part of the robotic arm; wherein the at least one first adhesive bead is configured to reinforce a joint of a respective separator to the first base of the pallet; and wherein an end portion impregnated with the adhesive of the second tubular body is configured to fit into the opening of said first base of the pallet.

5. The machine for manufacturing pallets according to claim 4, wherein the gripper is configured to rotate during the application of the at least one first adhesive bead on the exterior face of the second tubular body of the respective separator.

6. The machine for manufacturing pallets according to claim 1, wherein the rotary feeder comprises an upper support and a lower support at different heights which have several radial housings which are configured to receive first tubular bodies and second tubular bodies respectively.

7. The machine for manufacturing pallets according to claim 6, wherein the rotary feeder comprises retention devices located corresponding to outlets of the radial housings of the rotary feeder; wherein each retention device comprises a pair of fins and a pair of springs which articulate in axes against a resistance of springs; and wherein said fins are configured to press in opposition on a tubular body by an action of the springs.

8. The machine for manufacturing pallets according to claim 1, wherein the first base is secured on the transport table by way of a pressure device which pushes on said first base against the transport table.

9. The machine for manufacturing pallets according to claim 1, wherein the gripper comprises:

a support structure;

a first securing module configured to secure the first tubular body along an internal face thereof and a second securing module configured to secure the second tubular body along an internal face thereof; wherein the two securing modules comprise first mandrels and second mandrels, respectively, which are equidistant from a central axial direction of the support structure of the gripper;

first linear actuators and second linear actuators which are configured to respectively move the first mandrels and the second mandrels in radial directions;

wherein the gripper is configured to simultaneously secure the first tubular body and the second tubular body in coaxial positions spaced apart from one another.

10. The machine for manufacturing pallets according to claim 9, wherein each of the first mandrels and the second mandrels comprise a curved plate and a guide plate by way of which said mandrels are coupled to the support structure of the gripper.

11. The machine for manufacturing pallets according to claim 10, wherein the curved plates of the first mandrels and second mandrels have exterior faces which include rough surfaces which are configured to improve a grip and securing of the tubular bodies.

12. The machine for manufacturing pallets according to claim 10, wherein the curved plates of the mandrels have exterior faces which include recesses which are configured to receive strips of elastomer material to improve a grip and securing of the tubular bodies.

13. The machine for manufacturing pallets according to claim 9, wherein the first linear actuators and the second linear actuators comprise plungers which are coupled in radial openings located in first bodies and second bodies respectively which are integral to the support structure of the gripper.

14. The machine for manufacturing pallets according to claim 9, wherein the second securing module is located in an end part of the gripper, while the first securing module is located in an intermediate part of said gripper.

15. The machine for manufacturing pallets according to claim 9, wherein the first mandrels and the second mandrels include chamfered leading edges configured to facilitate a start of a relative axial coupling between said mandrels and the tubular bodies.

16. The machine for manufacturing pallets according to claim 9, wherein the first mandrels comprise exterior steps which separate first parts with dimensions in accordance with a closed contour delimited by the internal face of the first tubular body and second parts with dimensions in accordance with a closed contour delimited by the internal face of the second tubular body; wherein the second parts of the first mandrels are intended to complement the securing of the second tubular body.

* * * * *